US 9,267,079 B2

(12) United States Patent
Kimura et al.

(10) Patent No.: US 9,267,079 B2
(45) Date of Patent: Feb. 23, 2016

(54) PHOSPHORUS-FREE BASED HALOGEN-FREE FLAME-RETARDANT RESIN COMPOSITION, PHOSPHORUS-FREE BASED HALOGEN-FREE FLAME-RETARDANT INSULATED ELECTRIC WIRE AND PHOSPHORUS-FREE BASED HALOGEN-FREE FLAME-RETARDANT CABLE

(71) Applicant: HITACHI CABLE, LTD., Tokyo (JP)

(72) Inventors: Hitoshi Kimura, Hitachi (JP); Motoharu Kajiyama, Takahagi (JP); Takuya Suzuki, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 253 days.

(21) Appl. No.: 13/796,425

(22) Filed: Mar. 12, 2013

(65) Prior Publication Data
US 2013/0240239 A1 Sep. 19, 2013

(30) Foreign Application Priority Data
Mar. 14, 2012 (JP) ................. 2012-057008

(51) Int. Cl.
*C09K 21/14* (2006.01)
(52) U.S. Cl.
CPC ..................... *C09K 21/14* (2013.01)
(58) Field of Classification Search
CPC ......................................... C09K 21/14
USPC .............. 174/110, 121 A, 110 S; 524/262
See application file for complete search history.

(56) References Cited

U.S. PATENT DOCUMENTS

| 2002/0019468 A1* | 2/2002 | Tomari et al. ............... 524/202 |
| 2008/0311328 A1* | 12/2008 | Kimura ..................... 428/36.91 |
| 2009/0137755 A1* | 5/2009 | Yamada et al. ............. 526/112 |

FOREIGN PATENT DOCUMENTS

| JP | 03-197539 | 8/1991 |
| JP | 2001-214010 | 8/2001 |
| JP | 2003-221479 | 8/2003 |
| JP | 2008-037927 | 2/2008 |
| JP | 2009-019190 A | 1/2009 |

OTHER PUBLICATIONS

Japanese Patent Office Action mailed Jul. 8, 2014 and English translation of Reasons for refusal of JP Application No. 2013-032762.

* cited by examiner

*Primary Examiner* — Timothy Thompson
*Assistant Examiner* — Charles Pizzuto
(74) *Attorney, Agent, or Firm* — Roberts Mlotkowski Safran & Cole, PC

(57) ABSTRACT

A phosphorus-free based halogen-free flame-retardant resin composition includes a base polymer including a copolymer of ethylene and α-olefin having carbon number of 3 to 8 polymerized by a metallocene catalyst as a main component, and 5 to 30 weight % of an ethylene-vinyl acetate copolymer that has a melt flow rate of not less than 50 g/min and a vinyl acetate content of not less than 40%, a metal hydroxide blended with the base polymer in a ratio of 100 to 250 parts by weight relative to 100 parts by weight of the base polymer, and a mineral oil blended with the base polymer in a ratio of 1 to 20 parts by weight relative to 100 parts by weight of the base polymer.

14 Claims, 1 Drawing Sheet

PHOSPHORUS-FREE BASED HALOGEN-FREE FLAME-RETARDANT RESIN COMPOSITION, PHOSPHORUS-FREE BASED HALOGEN-FREE FLAME-RETARDANT INSULATED ELECTRIC WIRE AND PHOSPHORUS-FREE BASED HALOGEN-FREE FLAME-RETARDANT CABLE

The present application is based on Japanese patent application No. 2012-057008 filed on Mar. 14, 2012, the entire contents of which are incorporated herein by reference.

BACKGROUND OF THE INVENTION

1. Field of the Invention

This invention relates to a phosphorus-free based halogen-free flame-retardant resin composition that has high flame-retardant properties that pass foreign flame-retardant standards (EN, DIN, BS), is excellent in mechanical characteristics, and has a flat and smooth extrusion appearance, a phosphorus-free based halogen-free flame-retardant insulated electric wire and a phosphorus-free based halogen-free flame-retardant cable.

2. Description of the Related Art

In recent years, wires and cables with insulations that do not use polyvinyl chloride and halogen based flame-retardants so as to be reduced in environmental load spread rapidly as so-called "eco-electric wire" and "eco-cable".

In the halogen-free flame-retardant electric wire and the halogen-free flame-retardant cable, it is common to use a resin composition as an insulator of the electric wire, the resin composition configured such that halogen-free flame-retardants such as magnesium hydroxide are blended in a polyolefin in large amounts.

In order to realize high flame-retardant properties in a vertical flame test that pass the foreign flame-retardant standards (EN, DIN, BS) by using the halogen-free flame-retardants such as magnesium hydroxide, it is necessary for the halogen-free flame-retardants to be blended therein in large amounts, thus there is a problem that mechanical characteristics such as tensile strength, elongation are drastically lowered.

For the purpose of solving the above-mentioned problem, a method of using a polyolefin as a base polymer has been proposed, the polyolefin being polymerized by a metallocene catalyst, and having narrow molecular weight distribution, high strength and flexibility (for example, refer to JP-A-2009-019190).

SUMMARY OF THE INVENTION

The above-mentioned method has an excellent advantage that even if the halogen-free flame-retardants are blended therein in large amounts relative to the base polymer, the mechanical characteristics are not likely to be lowered, but the method is not without room for improvement.

Namely, in order to reduce the production cost, it is preferable that the extrusion speed of the resin composition is increased, but a polymer having narrow molecular weight distribution such as a polyolefin polymerized by a metallocene catalyst has a tendency to remarkably generate melt fractures at the time of extrusion molding, thereby the extrusion appearance may be damaged.

On the other hand, there is a method of reducing the amount of the halogen-free flame-retardants by adding a flame retardant aid such as red phosphorus, but concern about red phosphorus is pointed out that it produces harmful phosphine at the time of burning and generates phosphoric acid at the time of discarding so as to contaminate underground water vein, thus in recent years, there is a tendency to reduce the use of red phosphorus, it is needed to develop a phosphorus-free based halogen-free flame-retardant electric wire and a phosphorus-free based halogen-free flame-retardant cable that are excellent in flame-retardant properties.

Accordingly, it is an object of the invention to provide a phosphorus-free based halogen-free flame-retardant resin composition that has high flame-retardant properties to pass the foreign flame-retardant standards (EN, DIN, BS), is excellent in mechanical characteristics, and has a flat and smooth extrusion appearance, as well as a phosphorus-free based halogen-free flame-retardant insulated electric wire and a phosphorus-free based halogen-free flame-retardant cable.

(1) According to one embodiment of the invention, a phosphorus-free based halogen-free flame-retardant resin composition comprises:

a base polymer comprising a copolymer of ethylene and α-olefin having carbon number of 3 to 8 polymerized by a metallocene catalyst as a main component, and 5 to 30 weight % of an ethylene-vinyl acetate copolymer that has a melt flow rate of not less than 50 g/min and a vinyl acetate content of not less than 40%;

a metal hydroxide blended with the base polymer in a ratio of 100 to 250 parts by weight relative to 100 parts by weight of the base polymer; and a mineral oil blended with the base polymer in a ratio of 1 to 20 parts by weight relative to 100 parts by weight of the base polymer.

In the above embodiment (1) of the invention, the following modifications and changes can be made.

(i) The copolymer of ethylene and α-olefin comprises one of ethylene propylene copolymer, ethylene butene copolymer, ethylene hexene copolymer and octene propylene copolymer.

(ii) The metal hydroxide comprises one of magnesium hydroxide, aluminum hydroxide and calcium hydroxide.

(iii) The mineral oil comprises one of paraffin base oil, naphthene base oil and aroma based oil.

(2) According to another embodiment of the invention, a phosphorus-free based halogen-free flame-retardant insulated electric wire comprises:

a conductor; and an insulation layer formed on a periphery of the conductor and comprising the phosphorus-free based halogen-free flame-retardant resin composition according to the embodiment (1).

(3) According to another embodiment of the invention, a phosphorus-free based halogen-free flame-retardant cable comprises:

an insulated electric wire comprising a conductor and an insulation layer formed on a periphery of the conductor; and a sheath formed on a periphery of the insulated electric wire and comprising the phosphorus-free based halogen-free flame-retardant resin composition according to the embodiment (1).

Effects of the Invention

According to one embodiment of the invention, a phosphorus-free based halogen-free flame-retardant resin composition can be provided that has high flame-retardant properties to pass the foreign flame-retardant standards (EN, DIN, BS), is excellent in mechanical characteristics, and has a flat and smooth extrusion appearance, as well as a phosphorus-free based halogen-free flame-retardant insulated electric wire and a phosphorus-free based halogen-free flame-retardant cable using the resin composition.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Hereinafter, the invention will be explained in detail.

The invention can offer a phosphorus-free based halogen-free flame-retardant resin composition that includes a base polymer comprising a copolymer of ethylene and α-olefin having carbon number of 3 to 8 polymerized by a metallocene catalyst as a main component, and 5 to 30 weight % of an ethylene-vinyl acetate copolymer that has a melt flow rate of not less than 50 g/min and a vinyl acetate content of not less than 40%, a metal hydroxide blended with the base polymer in a ratio of 100 to 250 parts by weight relative to 100 parts by weight of the base polymer, and a mineral oil blended with the base polymer in a ratio of 1 to 20 parts by weight relative to 100 parts by weight of the base polymer.

The invention has succeeded in manufacturing a phosphorus-free based halogen-free flame-retardant insulated electric wire that is capable of maintaining mechanical strength, elongation and flexibility even if metal hydroxides are blended therein in large amounts, by using a copolymer of ethylene and α-olefin having carbon number of 3 to 8 polymerized by a metallocene catalyst as a base, the copolymer being flexible and excellent in mechanical strength, and that is simultaneously capable of being easily formed and having a flat and smooth appearance even if flame-retardants are highly filled, by blending an ethylene-vinyl acetate copolymer that has a high vinyl acetate content and a mineral oil.

Figure 1:
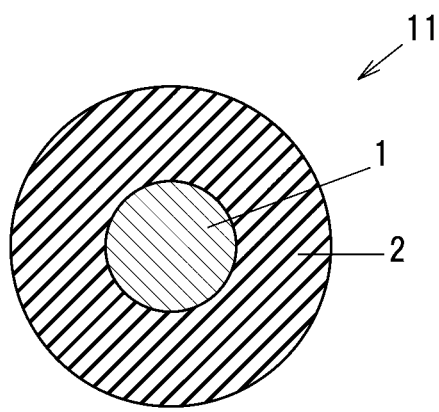
FIG. 1 is a cross-sectional view schematically showing a phosphorus-free based halogen-free flame-retardant insulated electric wire according to an embodiment of the invention.

FIG. 1 is a cross-sectional view showing a configuration example of the phosphorus-free based halogen-free flame-retardant insulated electric wire according to an embodiment of the invention.

The phosphorus-free based halogen-free flame-retardant insulated electric wire 11 is configured to include a conductor 1 and an insulation layer 2 formed so as to cover a periphery of the conductor 1, and as to each material, for example, the conductor 1 can be comprised of copper or a copper alloy, if it is a conductive material, there is not particular limitation, and the insulation layer 2 is comprised of the phosphorus-free based halogen-free flame-retardant resin composition that will be explained below.

Figure 2:
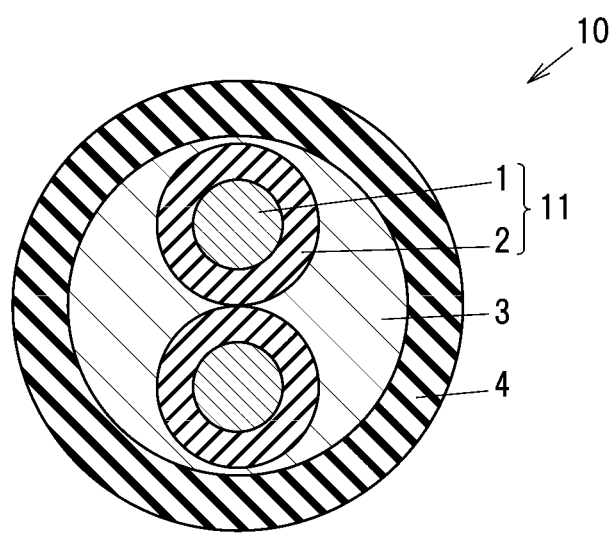
FIG. 2 is a cross-sectional view schematically showing a phosphorus-free based halogen-free flame-retardant cable according to an embodiment of the invention.

FIG. 2 is a cross-sectional view schematically showing a phosphorus-free based halogen-free flame-retardant cable according to an embodiment of the invention.

As shown in FIG. 2, the phosphorus-free based halogen-free flame-retardant cable 10 according to the embodiment includes a core configured such that two phosphorus-free based halogen-free flame-retardant insulated electric wires 11 arranged in parallel are pair-twisted together with an inclusion 3, and a sheath 4 comprised of a phosphorus-free based halogen-free flame-retardant resin composition explained below that is formed so as to cover an outer periphery of the core. The inclusion 3 is comprised of, for example, polypropylene.

As a base polymer of the phosphorus-free based halogen-free flame-retardant resin composition, polymers are used, the polymers comprised of a copolymer of ethylene and α-olefin having carbon number of 3 to 8 polymerized by a metallocene catalyst as a main component, and an ethylene-vinyl acetate copolymer that has a melt flow rate of not less than 50 g/min and a vinyl acetate content of not less than 40%.

As the copolymer of ethylene and α-olefin having carbon number of 3 to 8, for example, an ethylene propylene copolymer, an ethylene butene copolymer, an ethylene hexene copolymer, an octene propylene copolymer can be used.

As the α-olefin having carbon number of 3 to 8, for example, propylene, 1-butene, 4-methyl-1-pentene, 1-hexene, 1-octene and the like can be used. Of these, 1-butene and 1-octene are preferably used.

The reason why ethylene-vinyl acetate copolymer that has a vinyl acetate content of not less than 40% is used is that if the ethylene-vinyl acetate copolymer has a high vinyl acetate content, endothermic value thereof becomes large due to an acetic acid elimination reaction at the time of heat decomposition and the fact is preferable for the purpose of providing a VFT or VTFT level of high flame-retardant properties, on the other hand, if the vinyl acetate content is less than 40%, the flame-retardant properties are lowered.

The reason why ethylene-vinyl acetate copolymer that has a melt flow rate of not less than 50 g/min is used is that it is needed that the melt flow rate (hereinafter, abbreviated as "MFR") is not less than 50 g/min (230 degrees C.), if less than 50 g/min, a material in which flame-retardants are highly filled cannot be easily extruded.

In addition, in the invention, a base polymer obtained by blending a copolymer of ethylene and α-olefin and an ethylene-vinyl acetate copolymer is used, and the blending ratio is configured such that the copolymer of ethylene and α-olefin is blended as a main component in the whole base polymer, and the ethylene-vinyl acetate copolymer is blended in a ratio of 5 to 30 weight % in the whole base polymer. The reason why the blending ratio of the ethylene-vinyl acetate copolymer is defined as not less than 5 weight % as mentioned above is that if less than 5 weight %, an effect on improvement in extrusion workability is not expected, and the reason why defined as not more than 30 weight % is that if more than 30 weight %, mechanical strength is lowered.

In addition, in the invention, it is only necessary to be configured such that the copolymer of ethylene and α-olefin is blended as a main component in the whole base polymer, and the ethylene-vinyl acetate copolymer is blended in a ratio of 5 to 30 weight % in the whole base polymer, in so far as an effect of the invention is provided, a resin composition in which the other polymers are blended can be also used. For example, polyethylene such as LLDPE, an ethylene based copolymer such as EVA, EEA, and EP rubber can be blended.

In the invention, a metal hydroxide is used by adding to the base polymer. The reason why the metal hydroxide is used is that additional flame-retardant properties are provided for the base polymer.

As the metal hydroxide, for example, magnesium hydroxide, aluminum hydroxide, calcium hydroxide, and the like can be used. As the above-mentioned flame-retardants, flame-retardants are preferably used to which surface treatment is applied by using a silane coupling agent such as vinyl triethoxy silane, vinyl-tris(β-methoxyethoxy)silane, aminosilane; a fatty acid such as stearic acid, oleic acid; titanate; and the like by a well-known method.

The total blending amount of the metal hydroxide is configured to be in a ratio of 100 to 250 parts by weight relative to 100 parts by weight of the base polymer. The reason why the range is adopted is that if less than 100 parts by weight, flame-retardant properties cannot be obtained, and if more than 250 parts by weight, mechanical characteristics are drastically lowered. It is more preferable that the ratio is included in the range of 150 to 200 parts by weight.

In the invention, a mineral oil is used by adding to the base polymer. The reason why the mineral oil is used is that load on the extruder is further reduced at the time of extrusion and extrusion appearance is made flat and smooth.

The mineral oil used for the invention is, for example, a process oil for rubber, and in particular, one or not less than two selected from the group consisting of a paraffin base oil, a naphthene base oil and an aroma based oil individually or in combination of thereof. In particular, it is preferred to use the paraffin base oil that has high compatibility with the copolymer of ethylene and α-olefin.

The total blending amount of the mineral oil is configured to be in a ratio of 1 to 20 parts by weight relative to 100 parts by weight of the base polymer. The reason why the range is adopted is that if less than 1 parts by weight, an effect on improvement in extrusion workability is not expected, and if more than 20 parts by weight, flame-retardant properties and mechanical characteristics are drastically lowered.

Further, in accordance with use application of the phosphorus-free based halogen-free flame-retardant insulated electric wire and the phosphorus-free based halogen-free flame-retardant cable, it can be also adopted that an electron beam or UV rays is radiated to the electric wire and the cable obtained as mentioned above, or cross-linking treatment is applied to the electric wire and the cable by using an organic peroxide by a well-known method.

Furthermore, in the invention, in addition to the above-mentioned components, an auxiliary cross-linking agent, a flame-retardant aid, an antioxidant, a lubricant, a stabilizer, a filler, a colorant, silicone and the like can be also added thereto.

In addition, the phosphorus-free based halogen-free flame-retardant cable 10 has the sheath 4 comprised of the same resin composition as that of the insulation layer 2 of the phosphorus-free based halogen-free flame-retardant insulated electric wire 11, thus the phosphorus-free based halogen-free flame-retardant cable 10 can also provide the same function and effect as the phosphorus-free based halogen-free flame-retardant insulated electric wire 11.

The phosphorus-free based halogen-free flame-retardant cable 10 shown in FIG. 2 is configured such that both of the insulation layer 2 and the sheath 4 are comprised of the above-mentioned phosphorus-free based halogen-free flame-retardant resin composition, but limited to this, the phosphorus-free based halogen-free flame-retardant cable 10 according to the invention can be also configured such that only the sheath 4 is comprised of the above-mentioned resin composition.

The phosphorus-free based halogen-free flame-retardant resin composition that constitutes the insulation layer 2 and the sheath 4 can be used as a protection layer of not only an electric wire and a cable having a circular cross-section, but also a cable having a flat cross-section.

Next, the embodiment according to the invention will be explained based on Examples, but the embodiment according to the invention is not limited to the Examples.

EXAMPLES 1 to 6

In both of Example and Comparative Example, components described in Table 1 was fed into open rolls of 8 inches maintained at temperature of 100 to 130 degrees C. so as to be blended, after the blending, the blended components were extruded on a copper wire configured such that 7 single wires having a conductor of 0.26 mm in diameter are twisted by using a 40 mm extruder (L/D=24) maintained at temperature of 100 degrees C. so as to cover the copper wire to have a thickness of 1.0 mm. Subsequently, this was fed into a steam vulcanization can of 12 atmospheres for 3 minutes so as to be cross-linked, so that a halogen-free flame-retardant electric wire (sample) was manufactured.

COMPARATIVE EXAMPLES 1 to 7

Similarly to Examples 1 to 6, samples were manufactured by using resin compositions shown in Table 2.

Evaluation of each sample was carried out by using the following methods.

Flame-Retardant Properties

Samples were subjected to a vertical flame test in accordance with EN60811-2-1 so as to evaluate flame-retardant properties in vertical position. The evaluation was carried out by using the following evaluation criteria, namely samples that self-extinguished after not more than 1 minute were evaluated as "Acceptable" (○) and samples that self-extinguished after more than 1 minute were evaluated as "Unacceptable" (X).

Tensile Characteristics

Tubes obtained by being extracted from the Samples were subjected to a tensile test in accordance with JIS C3005 so as to evaluate tensile characteristics. In this case, the tensile speed was set to 200 mm/min, and the respective targets of tensile strength and elongation rate were set to not less than 10 MPa and not less than 350%.

Extrusion Appearance

Condition of the sample surface was visually observed when sample was extruded at an extruding speed of 40 m/min while slightly being pulled down, and samples that had a flat and smooth appearance were evaluated as "Acceptable" (○) and samples that had a rough appearance were evaluated as "Unacceptable" (X).

TABLE 1

| | | Examples | | | | | |
| --- | --- | --- | --- | --- | --- | --- | --- |
| | Components | 1 | 2 | 3 | 4 | 5 | 6 |
| Blending | Ethylene propylene copolymer (EP11 from JSR) | 70 | — | — | — | — | — |
| | Ethylene butene copolymer (TAFMER A4086S from Mitsui Chemicals) | — | 75 | 95 | — | 75 | — |
| | Ethylene butene copolymer (TAFMER A1070S from Mitsui Chemicals) | — | — | — | 75 | — | — |
| | Ethylene octene copolymer (TAFMER H5030S from Mitsui Chemicals) | — | — | — | — | — | 75 |
| | EVA (EV45X from Du Pont-Mitsui Polychemicals Co., Ltd.) | 30 | 25 | 5 | 25 | 25 | 25 |

TABLE 1-continued

| | Components | Examples 1 | 2 | 3 | 4 | 5 | 6 |
|---|---|---|---|---|---|---|---|
| | Mineral oil A (paraffin based, SUNPAR 115 from SUNOCO Co., Ltd.) | 3 | 2 | 10 | 3 | 2 | — |
| | Mineral oil B (naphthene based, SUNTHENE 415 from SUNOCO Co., Ltd.) | — | — | — | 3 | — | 5 |
| | Ethylene propylene copolymer modified with maleic acid (TAFMER MH5040 from Mitsui Chemicals) | — | — | 10 | 5 | — | — |
| | Silane-treated magnesium hydroxide (MAGSEEDS S4 from Kanoshima Chemicals Co., Ltd.) | 150 | — | — | — | 80 | 100 |
| | Stearic acid-treated magnesium hydroxide (MAGSEEDS N4 from Kanoshima Chemicals Co., Ltd.) | — | — | 150 | — | — | — |
| | Silane-treated aluminum hydroxide (BF013STV from Nippon Light Metal Co., Ltd.) | — | — | 100 | 80 | — | — |
| | Stearic acid-treated aluminum hydroxide (HIGILITE H42S from Syowa Denko) | — | 160 | — | 80 | 80 | — |
| | Cross-linking agent (PERBUTYL P from Nippon Oil and Fat Co., Ltd.) | 2 | 2 | 2 | 2 | 2 | 2 |
| | Auxiliary cross-linking agent (trimethylolpropane-trimethacrylate) | 3 | 3 | 3 | 3 | 3 | 3 |
| | Antioxidant (ADK STAB AO-18 from ADEKA Corporation) | 2 | 2 | 2 | 2 | 2 | 2 |
| | Colorant (carbon black) | 5 | 5 | 5 | 5 | 5 | 5 |
| Evaluation result | Tensile strength (MPa) Target: 10≤ | 11.6 | 10.9 | 11.5 | 11.2 | 11.1 | 13.8 |
| | Elongation (%) Target: 350≤ | 420 | 500 | 380 | 430 | 450 | 540 |
| | Flame-retardant properties (VFT) Extinguished after not more than 60 seconds | ○ | ○ | ○ | ○ | ○ | ○ |
| | Extrusion appearance (Visual observation) To be flat and smooth | ○ | ○ | ○ | ○ | ○ | ○ |

TABLE 2

| | Components | Comparative Examples 1 | 2 | 3 | 4 | 5 | 6 | 7 |
|---|---|---|---|---|---|---|---|---|
| Blending | Ethylene propylene copolymer (EP11 from JSR) | 98 | — | — | — | — | — | — |
| | Ethylene butene copolymer (TAFMER A4086S from Mitsui Chemicals) | — | 65 | 85 | — | 75 | 75 | — |
| | Ethylene butene copolymer (TAFMER A1070S from Mitsui Chemicals) | — | — | — | 70 | — | — | — |
| | Ethylene octene copolymer (TAFMER H5030S from Mitsui Chemicals) | — | — | — | — | — | — | 75 |
| | EVA (EV45X from Du Pont-Mitsui Polychemicals Co., Ltd.) | 2 | 35 | 15 | 30 | 25 | 25 | — |
| | EVA (VA amount 28%, MFR 6.0) | — | — | — | — | — | — | 25 |
| | Mineral oil A (paraffin based, SUNPAR 115 from SUNOCO Co., Ltd) | 1 | 2 | — | 21 | 2 | — | — |
| | Mineral oil B (naphthene based, SUNTHENE 415 from SUNOCO Co., Ltd.) | — | — | — | — | — | 8 | 5 |
| | Ethylene propylene copolymer modified with maleic acid (TAFMER MH5040 from Mitsui Chemicals) | — | — | 10 | 5 | — | — | — |
| | Silane-treated magnesium hydroxide (MAGSEEDS S4 from Kanoshima Chemicals Co., Ltd.) | 150 | — | — | — | 80 | 260 | 100 |
| | Stearic acid-treated magnesium hydroxide (MAGSEEDS N4 from Kanoshima Chemicals Co., Ltd.) | — | — | 150 | — | — | — | — |
| | Silane-treated aluminum hydroxide (BF013STV from Nippon Light Metal Co., Ltd.) | — | — | — | 80 | — | — | — |
| | Stearic acid-treated aluminum hydroxide (HIGILITE H42S from Syowa Denko) | — | 160 | — | 80 | — | — | — |
| | Cross-linking agent (PERBUTYL P from Nippon Oil and Fat Co., Ltd.) | 2 | 2 | 2 | 2 | 2 | 2 | 2 |
| | Auxiliary cross-linking agent (trimethylolpropane-trimethacrylate) | 3 | 3 | 3 | 3 | 3 | 3 | 3 |
| | Antioxidant (ADK STAB AO-18 from ADEKA corporation) | 2 | 2 | 2 | 2 | 2 | 2 | 2 |
| | Colorant (carbon black) | 5 | 5 | 5 | 5 | 5 | 5 | 5 |
| Evaluation result | Tensile strength (MPa) Target: 10≤ | 13.5 | 7.5 | 11.8 | 8.6 | 12.4 | 9.4 | 14.6 |
| | Elongation (%) Target: 350≤ | 420 | 520 | 450 | 460 | 510 | 80 | 520 |
| | Flame-retardant properties (VFT) Extinguished after not more than 60 seconds | ○ | ○ | ○ | X | X | ○ | X |
| | Extrusion appearance (Visual observation) To be flat and smooth | X | ○ | X | ○ | ○ | ○ | X |

As shown in Table 1, it is recognized that all of Examples 1 to 5 included in the invention are acceptable for the vertical flame test and have good tensile characteristics and extrusion appearance.

On the other hand, as shown in Table 2, Comparative Example 1 configured such that the content of ethylene-vinyl acetate copolymer is less than the defined value of the invention has a bad extrusion appearance, and Comparative Example 2 configured such that the content of the copolymer is more than the defined value of the invention is reduced in tensile strength. In addition, as a result, Comparative Example 3 configured such that the mineral oil is not contained therein has a bad extrusion appearance, and Comparative Example 4 configured such that the content of the mineral oil is more than the defined value of the invention are drastically inferior to both of flame-retardant properties and tensile strength. Furthermore, it is recognized that with regard to Comparative Examples 5, 6 configured such that the total blending amount of the metal hydroxide does not fall within the defined range of the invention, Comparative Example 5 having the total blending amount less than defined value is reduced in flame-retardant properties to a large extent, and Comparative Example 6 having the total blending amount more than the defined value is reduced in both of tensile strength and elongation to a large extent, and Comparative Example 7 configured such that the VA amount of the ethylene-vinyl acetate copolymer is less than the defined value of the invention and the melt flow rate is also less than the defined value of the invention is reduced in flame-retardant properties and does not allow the extrusion appearance to be flat and smooth.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A phosphorus-free based halogen-free flame-retardant electrically-insulated electric wire, comprising:
   a conductor; and
   an insulation layer comprising a phosphorous-free based halogen-free flame-retardant composition coated around a periphery of the conductor, the phosphorous-free based halogen-free flame-retardant composition comprising:
   a base polymer including a copolymer of ethylene and α-olefin having 3 to 8 carbon atoms polymerized by a metallocene catalyst as a main component, and not less than 5 weight % and not more than 30 weight % of an ethylene-vinyl acetate copolymer having a vinyl acetate content of not less than 40%;
   a metal hydroxide mixed at 150 to 200 parts by weight per 100 parts by weight of the base polymer; and
   a mineral oil blended with the base polymer in a ratio of 1 to 20 parts by weight per 100 parts by weight of the base polymer.

2. The phosphorus-free based halogen-free flame-retardant electrically-insulated electric wire according to claim 1, wherein the insulation layer is derived from crosslinking, and has an elongation rate of not less than 350% in tensile testing in compliance with JIS C3005.

3. The phosphorus-free based halogen-free flame-retardant electrically-insulated electric wire according to claim 1, further comprising:
   a flame retardancy of being self-extinguished after not more than 1 minute in a vertical flame test according to EN60811-2-1.

4. The phosphorus-free based halogen-free flame-retardant electrically-insulated electric wire according to claim 1, further comprising:
   a tensile strength of not less than 10 MPa when a tube obtained by extracting the conductor from the phosphorus-free based halogen-free flame-retardant electrically-insulated electric wire is subjected to a tensile test according to JIS C3005.

5. The phosphorus-free based halogen-free flame-retardant electrically-insulated electric wire according to claim 1, wherein the mineral oil comprises one or not less than two process oils selected from the group consisting of a paraffin base oil, a naphthene base oil and an aroma based oil individually or in combination of thereof.

6. The phosphorus-free based halogen-free flame-retardant electrically-insulated electric wire according to claim 1, wherein the α-olefin having carbon number of 3 to 8 comprises propylene, 1-butene, 4-methyl-1-pentene, 1-hexene, or 1-octene.

7. A phosphorus-free based halogen-free flame-retardant cable, comprising:
   an electrically-insulated electric wire comprising a conductor and an insulation layer provided around a periphery of the conductor; and
   a sheath comprising a phosphorous-free based halogen-free flame-retardant composition coated around a periphery of the electrically-insulated electric wire the phosphorus-free based halogen-free flame-retardant resin composition comprising:
   a base polymer including a copolymer of ethylene and α-olefin having 3 to 8 carbon atoms polymerized by a metallocene catalyst as a main component, and not less than 5 weight % and not more than 30 weight % of an ethylene-vinyl acetate copolymer having a vinyl acetate content of not less than 40%;
   a metal hydroxide mixed at 150 to 200 parts by weight per 100 parts by weight of the base polymer; and
   a mineral oil blended with the base polymer in a ratio of 1 to 20 parts by weight per 100 parts by weight of the base polymer.

8. The phosphorus-free based halogen-free flame-retardant cable according to claim 7, wherein the insulation layer is derived from crosslinking, and has an elongation rate of not less than 350% in tensile testing in compliance with JIS C3005.

9. The phosphorus-free based halogen-free flame-retardant cable according to claim 7, further comprising:
   a flame retardancy of being self-extinguished after not more than 1 minute in a vertical flame test according to EN60811-2-1.

10. The phosphorus-free based halogen-free flame-retardant cable according to claim 7, further comprising:
    a tensile strength of not less than 10 MPa when a tube obtained by extracting the conductor from the phosphorus-free based halogen-free flame-retardant electrically-insulated electric wire is subjected to a tensile test according to JIS C3005.

11. The phosphorus-free based halogen-free flame-retardant cable according to claim 7, wherein the mineral oil comprises one or not less than two process oils selected from the group consisting of a paraffin base oil, a naphthene base oil and an aroma based oil individually or in combination of thereof.

12. The phosphorus-free based halogen-free flame-retardant cable according to claim 7, wherein the α-olefin having carbon number of 3 to 8 comprises propylene, 1-butene, 4-methyl-1-pentene, 1-hexene, or 1-octene.

13. The phosphorus-free based halogen-free flame-retardant cable according to claim 7, further comprising:
    a core comprising two phosphorus-free based halogen-free flame-retardant insulated electric wires according to claim 1 that are arranged in parallel and are pair-twisted together with an inclusion,
    wherein the sheath layer covers an outer periphery of the core.

14. The phosphorus-free based halogen-free flame-retardant cable according to claim 13, wherein the inclusion comprises polypropylene.

* * * * *